United States Patent [19]
Sugawara et al.

[11] Patent Number: 5,312,067
[45] Date of Patent: May 17, 1994

[54] SPINNING REEL

[75] Inventors: Kenichi Sugawara; Osamu Yoshikawa, both of Sakai, Japan

[73] Assignee: Shimano Inc., Osaka, Japan

[21] Appl. No.: 874,000

[22] Filed: Apr. 27, 1992

[30] Foreign Application Priority Data

May 7, 1991 [JP] Japan .............................. 3-030922[U]
May 15, 1991 [JP] Japan .............................. 3-034031[U]

[51] Int. Cl.⁵ .................................................. A01K 89/01
[52] U.S. Cl. ................................. 242/232; 242/246; 242/284; 242/307
[58] Field of Search ............... 242/233, 232, 246, 284, 242/307

[56] References Cited

U.S. PATENT DOCUMENTS

| | | | |
|---|---|---|---|
| 4,095,756 | 6/1978 | Morishita | 242/232 |
| 4,923,140 | 5/1990 | Yamaguchi | 242/233 |
| 4,932,616 | 6/1990 | McMickle | 242/233 |

FOREIGN PATENT DOCUMENTS

| | | | |
|---|---|---|---|
| 1144128 | 4/1983 | Canada | 242/232 |
| 62-80570 | 5/1987 | Japan . | |
| 2246276A | 1/1992 | United Kingdom . | |

*Primary Examiner*—Katherine Matecki
*Attorney, Agent, or Firm*—Dickstein, Shapiro & Morin

[57] ABSTRACT

A spinning reel has a reel body having a projection portion, a rotary frame, a bail arm and a toggle urge mechanism for switching over, via a drive arm, the bail arm between a fishing-line releasing position to a fishing-line retrieving position. Either a contacted portion of the drive arm to be contacted by the projection portion or this projection portion is projectable and retractable through contact with the other and is urged in a projecting direction by a projection urging mechanism. The projection urging mechanism has a push-out urging force equal to or substantially equal to a push-in force applied thereto by either the contacted portion or the projection portion in association with the rotary movement of the rotary frame in the line retrieving direction.

6 Claims, 12 Drawing Sheets

SPINNING REEL

BACKGROUND OF THE INVENTION

1 Field of the Invention

The present invention relates to a spinning reel, and more particularly to a spinning reel including a rotary frame having a pair of support arms, a bail arm extending between and pivotably attached to the support arms, the bail arm being switchable between a line releasing position for feeding a fishing line and a line retrieving position for retrieving the fishing line, a toggle urge mechanism for selectively maintaining the bail arm either at the line releasing position or the line retrieving position, and a position switchover mechanism for forcibly switching the bail arm from the line releasing position to the line retrieving position against an urging force of the toggle urge mechanism in association with a rotary movement of the rotary frame in a line retrieving direction. The position switchover mechanism includes a drive arm disposed inside one of the support arms for driving the bail arm and a projection formed on a surface of a reel body so as to drive the drive arm per se to a position corresponding to the line retrieving position through contact with the drive arm which is rotatable in unison with the rotary frame.

2 Description of the Related Art

In this type of spinning reel, when a handle is operated to rotate the rotary frame in the line retrieving direction, the drive arm and the projection on the reel body come into contact with each other thereby to automatically switch the bail arm to the line retrieving position, so that the construction can prevent a user from failing to effect the switchover operation by mistake. A conventional position switchover mechanism is disclosed, for example, in FIG. 1 of Japanese laid-open utility model gazette No. 62-80570. In this construction, there is provided a toggle urge mechanism for selectively urging a bail arm either to a line releasing position or to a line retrieving position by affecting an arm which carries the bail arm and is pivotably supported to the support arms of the rotary frame. A spring holder of this toggle urge mechanism is supported within the support arm. And, a piston pin which is projectably and retractably held within the spring holder is connected with the pivotable arm. Further, there is provided a drive arm for pivoting the bail arm to the line retrieving position by affecting the spring holder.

On the other hand, a reel body includes a projection operable to drive the drive arm through contact with this drive arm.

Both the drive arm and the projection are formed of a highly rigid material. For casting a fishing tackle, the bail arm has to be manually and directly switched over from the line retrieving position to the line releasing position. However, for the above-described rigidity, there sometimes arises a problem that the drive arm and the projection come into too strong contact and become locked with each other in case the drive arm and the projection happen to be located in a same rotational phase.

With the above, the bail arm will be stuck at an intermediate position between the line retrieving position and the line releasing position. If the user attempts to release the locked condition in a forcible manner, this may result in damage to the spring holder and/or the drive arm.

SUMMARY OF THE INVENTION

A primary object of the present invention is to provide a spinning reel which allows a smooth switchover movement of the bail arm to the line release position even when the drive arm and the projection happen to be located in a same rotational phase and which also allows a smooth reverse switchover movement of the bail arm to the line retrieving position through contact between the drive arm and the projection.

In order to accomplish the above-described object, a spinning reel according to the present invention comprises:

a rotary frame having a pair of support arms;

a bail arm extending between and pivotably attached to the support arms, the bail arm being switchable between a line releasing position and a line retrieving position;

a toggle urge mechanism for selectively maintaining the bail arm either at the line releasing position or the line retrieving position, and a position switchover mechanism for forcibly switching the bail arm from the line releasing position to the line retrieving position against an urging force of the toggle urge mechanism in association with a rotary movement of the rotary frame in a line retrieving direction, said position switchover mechanism including, a drive arm disposed inside one of the support arms for driving the bail arm, and a projection portion formed on a surface of a reel body so as to drive the drive arm per se to a position corresponding to the line retrieving position through contact with the drive arm which is rotatable in unison with the rotary frame;

wherein, either a contacted portion of said drive arm to be contacted by said projection portion or said projection portion is projectable and retractable through contact with the other and is urged in a projecting direction by a projection urging mechanism, said projection urging mechanism having a push-out urging force equal to or substantially equal to a push-in force applied thereto by either said contacted portion or said projection portion in association with the rotary movement of the rotary frame in the line retrieving direction.

Functions and effects of the above features will be described next.

When there tends to occur the interlocking between the contacted portion of the drive arm and the projection portion because these elements are located in a same rotational phase, either the contacted portion or the projection portion which is rendered projectable and retractable can be retracted if the drive arm is operated in the line releasing direction by a force overwhelming the force acting between the contacted portion and the projection portion during the rotary movement of the rotary frame in the line retrieving direction. Then, the drive arm, by the force from the bail arm, will smoothly pass the projection portion to switch over the bail arm to its line releasing position.

On the other hand, when the rotary frame is rotated in the line retrieving direction, the contacted portion or the projection will not receive such push-in force overwhelming the push-out urging force and therefore will not retract. Accordingly, through the contact between the contacted portion and the projection portion, the drive arm is moved to switch over the bail arm to the line retrieving position.

According to the present invention, there are provided the contacted portion and the projection portion either of which is rendered projectable and retractable and the push-out urging force therefor is so set as to substantially equate with the urging force applied when the rotary frame is rotated in the line retrieving direction. Through these simple arrangements, the present invention has provided an improved spinning reel which allows smooth switchover operation of the bail arm to its line releasing position at any rotation phase, while the reel of the invention retains the convenient feature of the convention provided for automatic switchover of the bail arm to the line retrieving position.

According to one preferred embodiment of the invention, the projection portion is urgedly maintained at its projected operable position by an urge mechanism when the projection portion comes into contact with the drive arm which is rotatable in unison in association with the rotary movement of the rotary frame in the line retrieving direction. And, this projection portion is rendered movable between the above operable position and a retracted inoperable position where the projection portion in retracted peripherally and radially when the projection portion receives a push-in force which overwhelms the urging force of the urge mechanism operable to maintain this projection portion at its projected operable position.

With these features, when there tends to occur the interlocking between the drive arm and the projection portion because these elements are located in a same rotational phase, by moving the drive arm in the releasing direction by a force overwhelming the contact force between the drive arm and the projection portion applied during the rotary movement of the rotary frame in the line retrieving direction, the projection portion is moved peripherally and radially to its retracted position, whereby the drive arm moves in the direction free from interlocking with the projection portion to switch over the bail arm to its line releasing position.

When the rotary frame is rotated in the line retrieving direction, the projection portion comes into contact with the drive arm. However, since the force of this contact is smaller in magnitude than the urging force provided by the urge mechanism, the projection will not retract by receiving such force overwhelming this projection urging force. Accordingly, the projection portion can move the drive arm to switch over the bail arm to its line retrieving position.

In short, with the further features of the invention, there is provided the projectable and retractable projection portion. And, the urging force for this projection portion is so set as to correspond to the force applied during the rotary movement of the rotary frame in the line retrieving direction. Further, the projection portion is rendered movable not only in the radial direction but also in the peripheral direction. With these, the invention has achieved a further improved spinning reel which allows smooth switchover of the bail arm to its line releasing position at any rotational phase without subjecting the projection to an excessive force while the reel of the invention retains the convenient feature of the convention provided for automatic switchover of the bail arm to the line retrieving position.

According to a further embodiment of the present invention, the projection portion is retractable in the peripheral direction by a predetermined range as the projection portion comes into contact with the drive arm rotatable in unison in association with the rotary movement of the rotary frame in the line retrieving direction. Further, the projection portion includes a cam element which is returned to its home position by a first urge mechanism with release of the contact and a support element which is retracted to allow passage of the drive arm when receiving a push-in force exceeding a predetermined value from the drive arm and which is returned to its home position by a second urge mechanism after the passage of the drive arm. Also, the second urge mechanism is provided with a predetermined urging force which exceeds a push-in force applied to the cam element from the drive arm when the rotary frame is rotated in the line retrieving direction.

With the above features, when the drive arm comes into contact with the cam element in association with the rotary movement of the rotary frame in the line retrieving direction, the cam element is moved in the peripheral direction against the urging force of the first urge mechanism and then stopped to receive the drive arm to move this drive arm for switching over the bail arm to the line retrieving position. Thus, the contact takes place in a soft manner between the drive arm and the cam element, so that the cam element and the drive arm will not receive strong and sudden impact. Moreover, in this case, since the contact force applied from the drive arm to the cam element is smaller in magnitude than the urging force of the second urge mechanism, the support element does not retract but provides the cam element with such force as sufficient to move the drive arm.

When the drive arm and the cam element become almost interlocked with each other so that the cam element is subjected to a large force exceeding the urging force of the second urge mechanism, the cam element is moved in the peripheral direction against the urging force of the first urge mechanism and is also moved in the radial direction together with the support element, so as to allow movement of the drive arm for switching over the bail arm to its line releasing position.

Accordingly, the cam element and the support element can be retracted in the direction along the moving direction of the drive arm for switching over the bail arm to its line releasing position. Also, this switchover of the bail arm to the line releasing position can take place smoothly without subjecting the cam element to an excessive force. And, it has become possible to reduce the contact force applied to the drive arm and the cam element applied during the switchover of the bail arm to the line retrieving position. In general, the construction can reduce the impact force applied to the drive arm and to the cam element during a position switchover of the bail arm. Consequently, it has become possible to reduce damage and resultant replacement of these components.

Further, and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a spinning reel according to the present invention, in which.

DESCRIPTION OF THE PREFERRED EMBODIMENTS

Preferred embodiments of a spinning reel relating to the present invention will now be described in detail with reference to the accompanying drawings.

Figure 8:
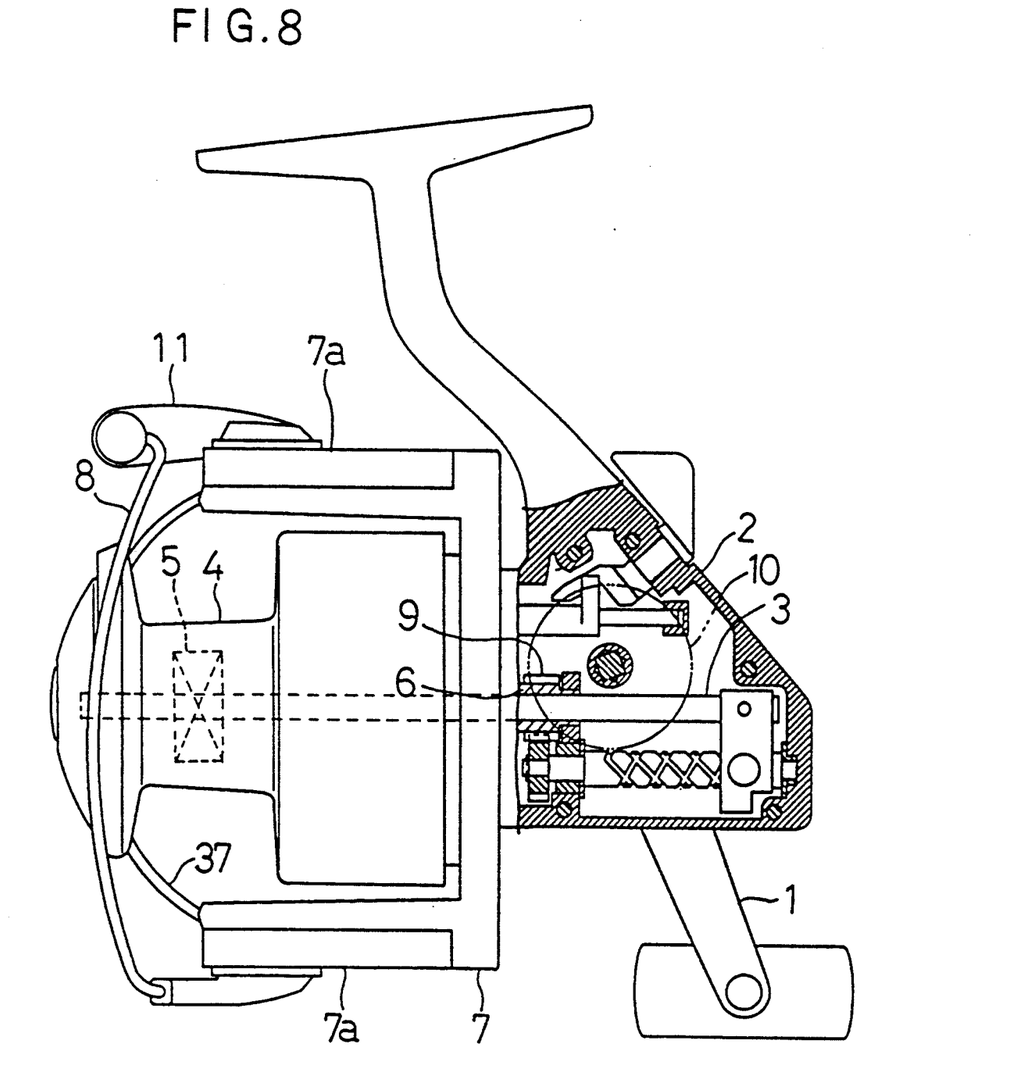
FIG. 8 is a partially cutaway side view of a spinning reel.

As shown in FIG. 8, a spinning reel includes a reel body 2 supporting a handle 1 and a spool shaft 3 extending from the reel body 2. The spool shaft 3 mounts a spool 4 and a drag unit 5 is interposed between the spool shaft 3 and the spool 4. The spool 4 is formed integrally with the spool shaft 3. At a base end of the spool shaft 3, there is loosely mounted a cylinder shaft 6 on which a rotary frame 7 is fitted to be rotatable with this shaft 6. Further, a pinion gear 9 is formed at a portion of the cylinder shaft 6 inside the reel body 2. Through meshing between this pinion gear 9 and a main gear 10 fitted on a handle shaft, the rotary frame 7 is rotated for retrieving a fishing line in response to an operation of the handle 1.

Figure 4:
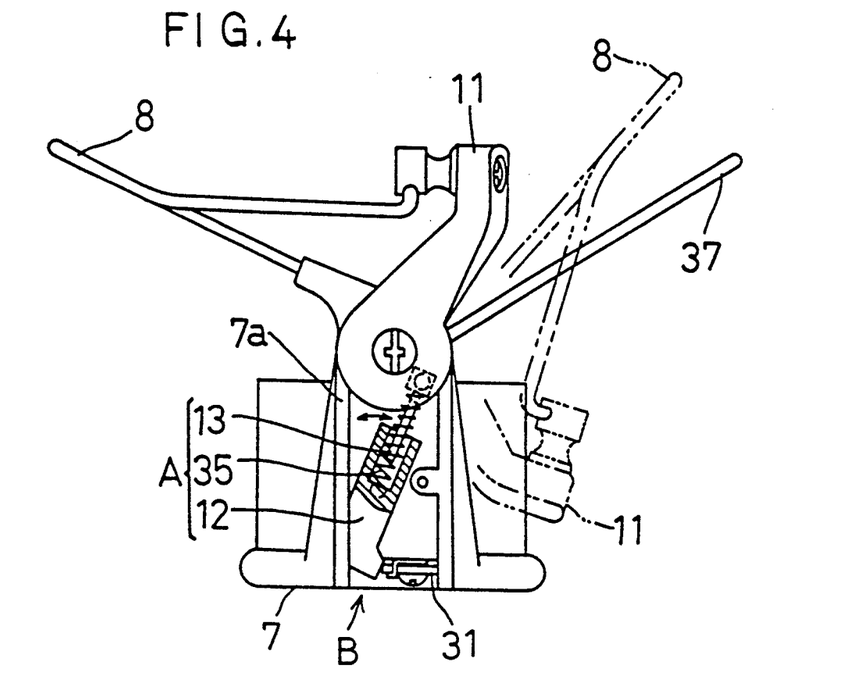
FIG. 4 is a plan view in section showing a toggle urge mechanism.

Next, a position switchover mechanism for a bail arm 8 will be described. As shown in FIG. 4, one terminal end of the bail arm 8 is fitted to a pivotable arm 11 to be pivotable therewith. And, in turn, this arm 11 is pivotably attached to one support arm 7a of the rotary frame 7. The other terminal end of the bail arm 8 is pivotably attached to the other support arm 7a. Inside the one support arm 7a, there is provided a toggle urge mechanism A for maintaining the bail arm 8 at either a line releasing position or a line retrieving position. This toggle urge mechanism A includes a spring holder 12 pivotable within an inner gap formed in the support arm 7a, a piston pin 13 held within the spring holder 12 to be projectable therefrom and retractable thereto and a spring 35 for urging the piston pin 13 in a projecting direction. A leading end of the piston pin 13 is connected to an inner face of the arm 11.

Figure 5:
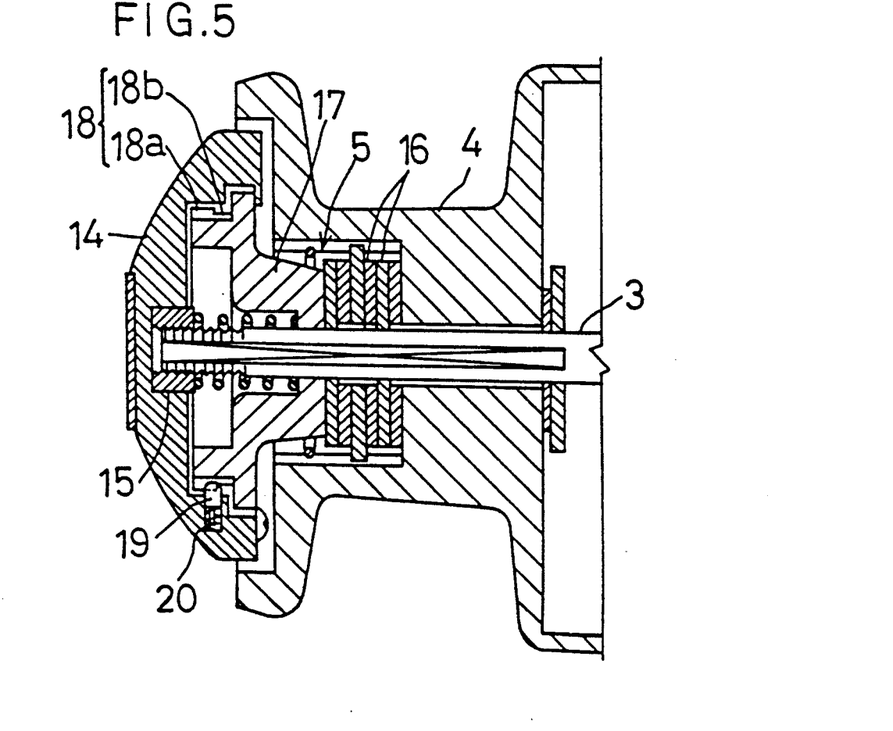
FIG. 5 is a side view in vertical section showing a drag unit.

Next, the drag unit 5 will be particularly described. As shown in FIG. 5, on the spool shaft 3, there is threaded a nut element 15 rotatable with a drag knob 14 to effect a relative movement along the spool shaft 3. Further, at a position more inwards than the nut element 15, the spool shaft 3 slidably and non-rotatably mounts a press element 17 which operates a friction plate 16. At a position closer to the drag knob 14 than the press element 17, there is projecting a cylinder portion 18, on which outer peripheral face there is formed a gear portion having threads extending along the axis of the spool shaft. Further, a leading end portion of this gear portion is formed as a high gear portion 18a and a rear end portion is formed as a low gear portion 18b. On an inner peripheral face of the drag knob 14 opposing the gear portion, there is attached an engaging pin 19 engageable with e.g. the high gear portion 18a. At a recess accommodating this engaging pin 19, a spring 20 is inserted to urge the engaging pin 19 in a projecting direction. In operation, in response to a rotation of the drag knob 14, the gear portion snaps the engaging pin 19 to produce a click sound. As the drag mechanism is tightened by rotating the drag knob 14, the knob 14 and the press element 17 come closer to each other, so that the snapping contact takes place between the engaging pin 19 and the low-gear portion 18b. On the other hand, when the drag mechanism is loosened by reversely rotating the drag knob 14, the knob 14 and the press element 17 move away from each other, so that the snapping contact takes place between the engaging pin 19 and the high-gear portion 18a thereby producing a clicking sound different from that produced by the contact between the pin 19 and the low-gear portion 18b. Then, if a border between the high-gear portion 18a and the low-gear portion 18b is set at a position where substantially no drag force is produced, the position can be audibly recognizable through the sound difference.

Figure 6:
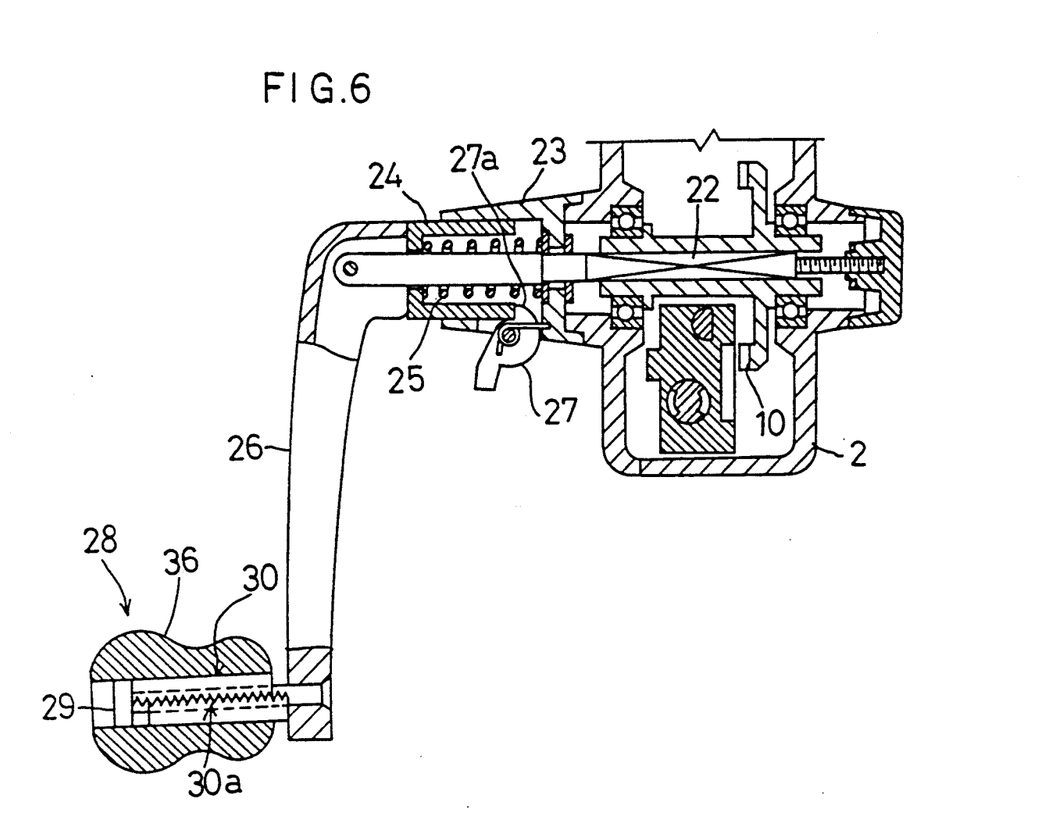
FIG. 6 is a section showing a folding lock mechanism for a handle.
Figure 7:
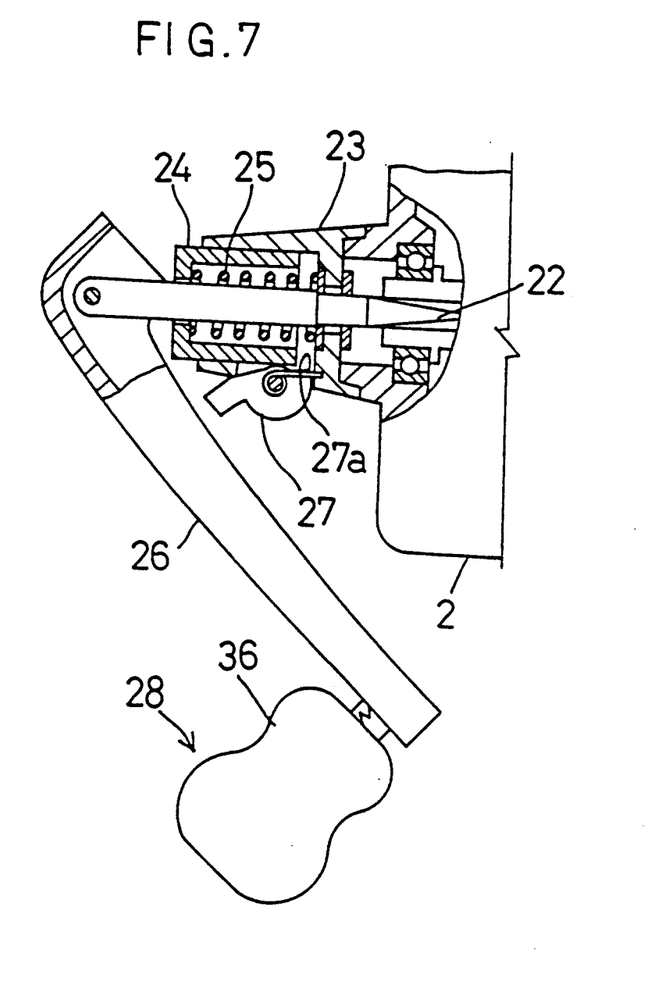
FIG. 7 is a further section of the folding lock mechanism for a handle.

Next, a folding construction for the handle 1 will be described. As illustrated in FIGS. 6 and 7, a receiver boss 23 is fitted on a handle shaft 22, with the boss 23 forming an outward space. In this outward space, there are disposed a gap setting element 24 and a spring 25 for outwardly urging the gap setting element 24. Further, on this handle shaft 22 extending through the receiver boss 23 and the gap setting element 24, there is supported a handle support frame 26. The receiver boss 23 pivotably supports a pivot cam 27 which cam portion 27a is rendered projectable into and retractable from the outward space. This cam portion 27a receives an inner end of the gap setting element 24. As shown in FIG. 6, when the pivot cam 27 receives the gap setting element 24, the handle 1 becomes operable. On the other hand, as shown in FIG. 7, when the pivot cam 27 is detached from the gap setting element 24, the handle 1 becomes foldable for storage.

Next, a construction of a grip portion 28 attached to the handle support frame 26 will be described. As shown in FIG. 6, the construction includes a support shaft 29 caulked to the support frame 26, and split bush halves 30 fitted on the support shaft 29 and an outer element 36 which is pressure-fitted onto the split bush halves 30. Serration-like engaging portions 30a are formed on opposing inner faces of the bush halves 30, so that these bush halves can be engaged with an axial displacement relative to each other as illustrated in FIG. 6. And, as one bush half 30 is attached to the support frame 26 while the other bush half 30 is attached to an end portion of the support shaft 29, the grip portion 28 can be prevented from being loosened.

Figure 1:
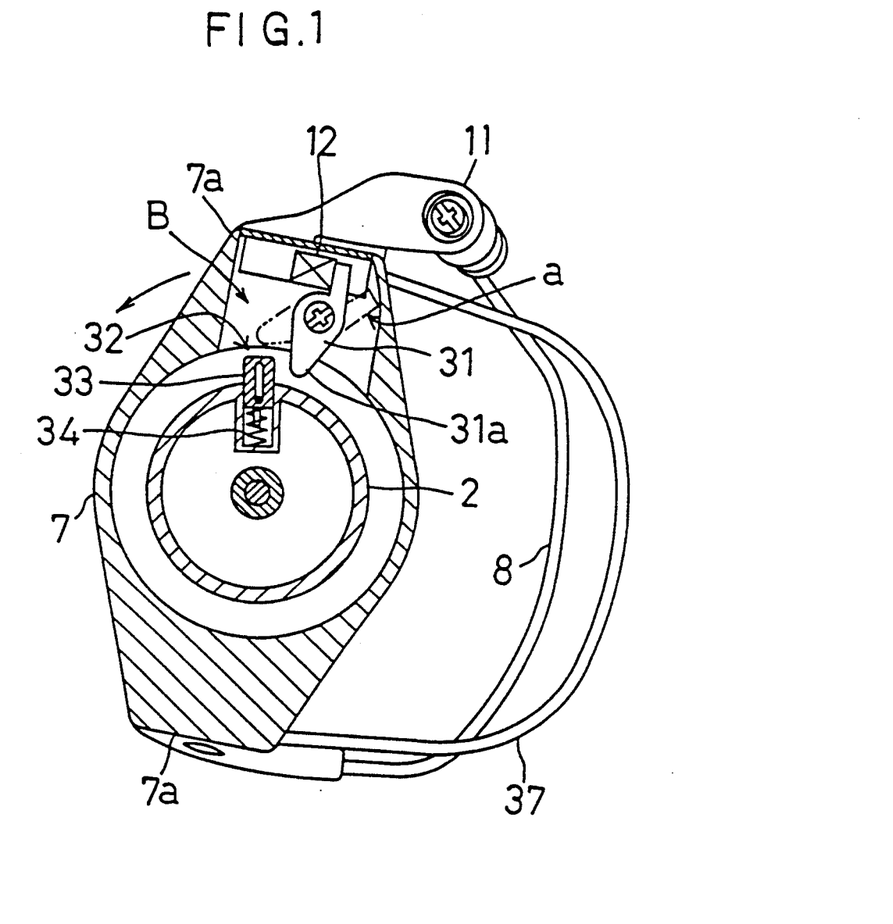
FIG. 1 is a rear view in vertical section showing a condition where a drive arm and a projection portion are about to come into contact with each other.
Figure 2:
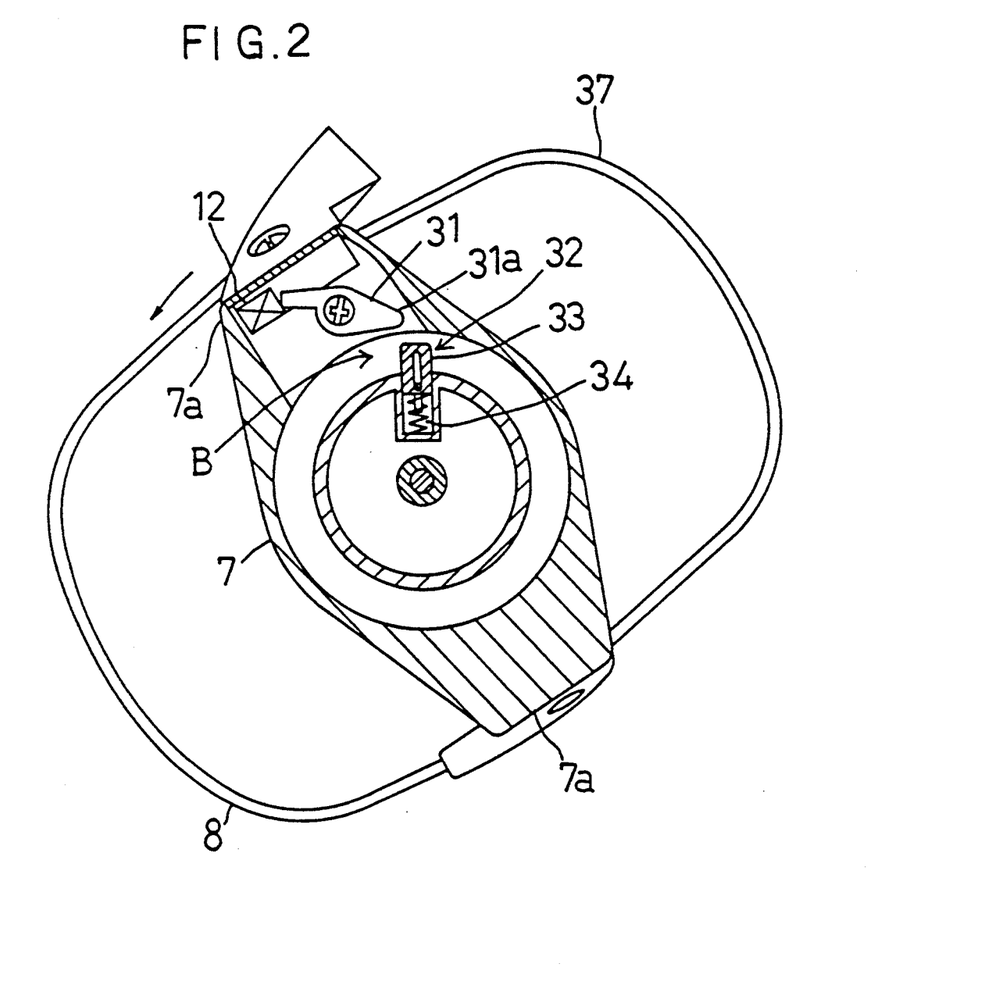
FIG. 2 is a rear view in vertical section showing a condition where the drive arm and the projection portion have just come into contact with each other.

Next, the position switchover mechanism B for forcibly switching over the bail arm 8 from the line releasing position to the line retrieving position will be more particularly described. As shown in FIGS. 1 and 2, to an end portion of the spring holder 12 on the side of the reel body 2, there is attached a drive arm 31 for pivotably driving the spring holder 12. And, on an inner end portion of the drive arm 31, there is provided a contacted portion 31a which comes into contact with a projection portion 32 to be described later. As illustrated in FIGS. 1 and 2, in operation, as the contacted portion 31a comes into contact with a side face of the projection portion 32, the drive arm 31 pivotably drives the spring holder 12 to switch over the bail arm 8 to the line retrieving position. At one portion of the reel body 2, there is defined a radially concave portion, in which a projectable (and retractable) member 33 is accommodated. Also, there is provided a spring 34 as a projection urge mechanism for urging the projectable member 33 in a projecting direction. Thus, this spring 34 and the projectable member 33 together constitute the projection portion 32.

Figure 3:
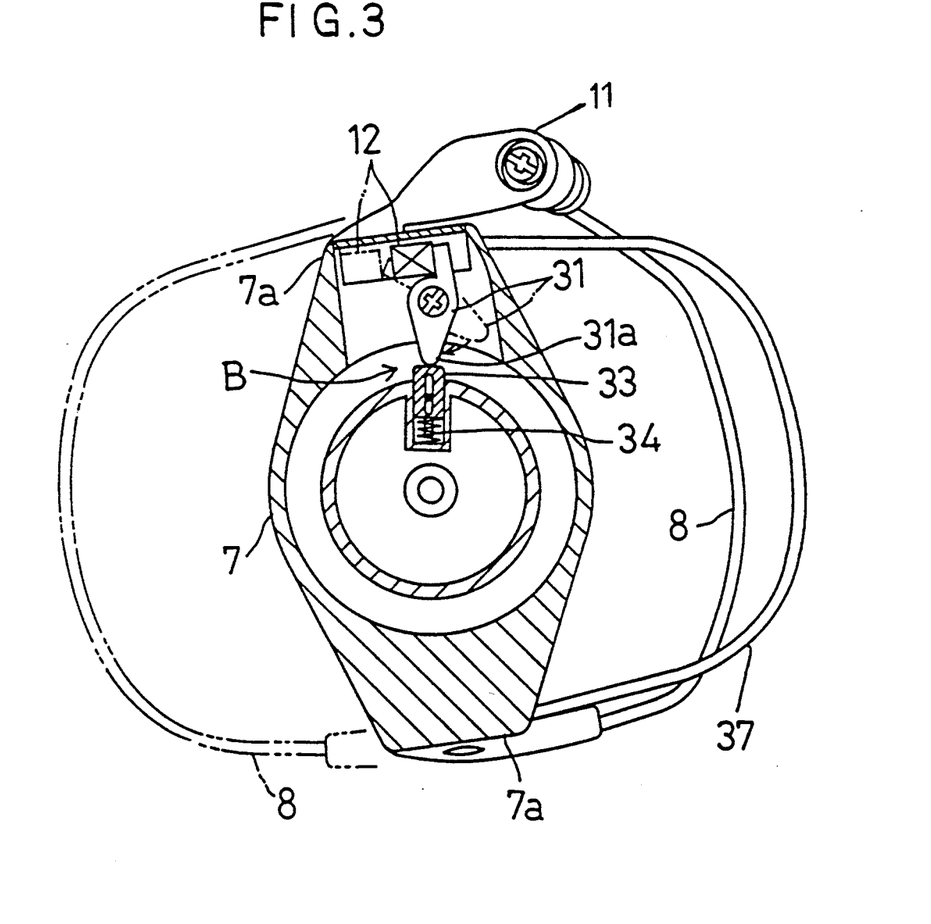
FIG. 3 is a rear view in vertical section showing a condition where the drive arm pushes down the projection to switch over the bail arm to a line releasing position.

The urging force of the spring 34 is set in a manner to be described next. That is, as shown in FIGS. 1 and 2, as the contacted portion 31a and the projectable portion 33 come into contact with each other with a rotation of the rotary frame 7 in the line retrieving direction, there is produced a push-in contact force from the former to the latter. Then, the spring 34 is provided with a first urging force which is larger in magnitude than the push-in contact force so as to prevent the projectable member 33 to being retracted and to allow the member 33 to pivotably drive the drive arm 31. As illustrated in FIG. 3, in switching over the bail arm 8 from the line retrieving position to the line releasing position, even if the contacted portion 31a and the projectable member 33 become almost interlocked with each other, with a forcible operation on the bail arm 8 to the direction of the line releasing position, the projectable member 33 is retracted against the urging force so as to allow the drive arm 31 to pass this projectable member 33 to render the drive arm 31 freely rotatable. Further, in order to allow smooth switchover of the bail arm 8 to the line releasing position, a second urging force is so set as to allow the projectable member 33 by a force larger than the first urging force.

At the space accommodating the drive arm 31, there is provided a recess for allowing smooth passage of the projectable member 33. With this, when the rotary frame 7 is reversely rotated, the drive arm 31 can pivot without much friction when its contacted portion 31a comes into contact with the projectable member 33.

As shown in FIG. 2, across the two support arms 7a, 7a, there is extended a rod-like member. This rod-like member is bent substantially symmetrically relative to the bail arm 8 at its line retrieving position, so that this member functions as a balance weight 37 for the rotation of the rotary frame 7.

It is conceivable to form a recess at the contacted portion 31a of the drive arm 31 so that the projectable member 33 can be inserted into this recess.

Next, some other embodiments of the invention will be described.

Figure 12:
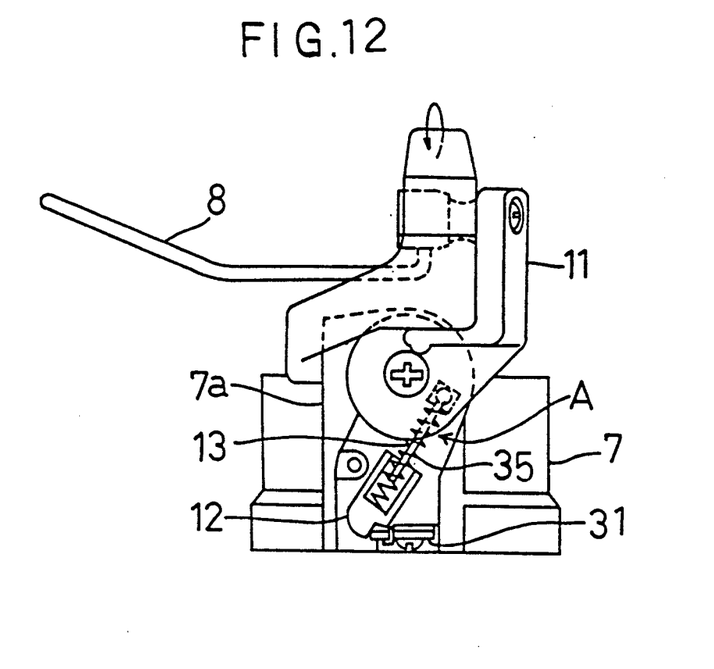
FIG. 12 is a plan view showing the toggle urge mechanism setting the bail arm to the line retrieving position.
Figure 13:
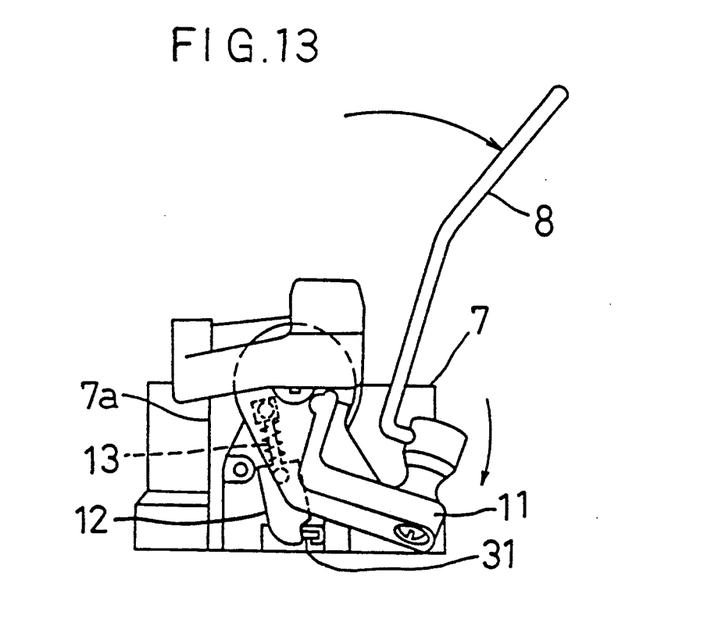
FIG. 13 is a plan view showing the toggle urge mechanism setting the bail arm to the line releasing position.

A position switchover mechanism for the bail arm 8 relating to a further embodiment will be described. As shown in FIGS. 12 and 13, one terminal end of the bail arm 8 is attached to the arm 11 to be pivotable therewith. The arm 11 is pivotably attached to one support arm 7a of the rotary frame 7, while the other terminal end of the bail arm 8 is pivotably attached to the other support shaft 7a. Inside the one support arm 7a, there is provided the toggle urge mechanism A for maintaining the bail arm 8 either at the line releasing position or at the line retrieving position. This toggle urge mechanism A includes the spring holder 12 pivotable within an inner gap of the support arm 7a, the piston pin 13 projectably and retractably held by the spring holder 12 and the spring 35 for urging the piston pin 13 in the projecting direction. The leading end of the piston pin 13 is connected to the inner face of the arm 11.

Figure 14:
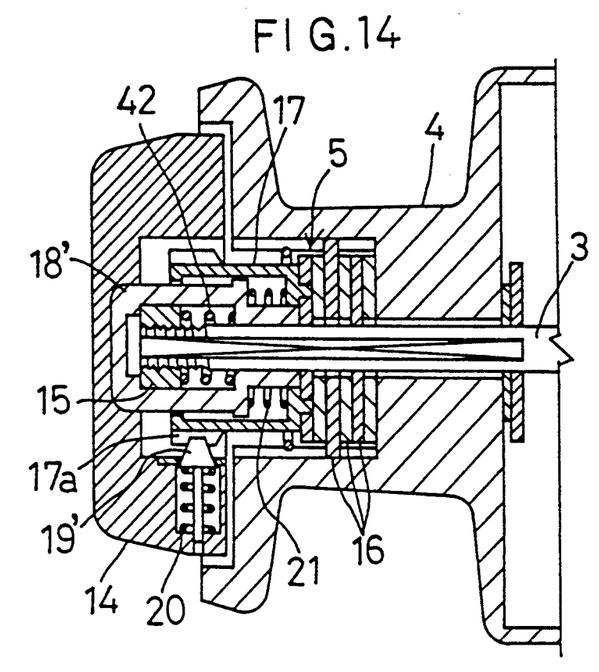
FIG. 14 is a side view in section showing the drag unit.

Next, the drag unit 5 will be particularly described. As shown in FIG. 14, on the spool shaft 3, there is threaded the nut element 15 rotatable with the drag knob 14 to effect a relative movement along the spool shaft 3. Further, at a position more inwards than the nut element 15, the spool shaft 3 slidably and non-rotatably mounts the press element 17 which operates the friction plate 16. Between the press element 17 and an intermediate cylinder element 18', there is provided a first spring 21 for urging the press element 17 against the friction plate 16. Also, between the intermediate cylinder element 18' and the nut element 15, there is provided a second spring 42. On an outer peripheral face of the press element 17, there is formed a gear portion 17a having threads extending along the axis of the spool shaft. Further, on an inner peripheral face of the drag knob 14 opposing the gear portion 17a, there is attached an engaging pin 19' engageable with the gear portion 17a. At a recess accommodating this engaging pin 19', the spring 20 is inserted to urge the engaging pin 19' in a projecting direction. In operation, in response to a rotation of the drag knob 14, the gear portion 17a snaps the engaging pin 19' to produce a click sound. As the drag mechanism is tightened by rotating the drag knob 14, the knob 14 and the press element 17 only become further overlapped with each other so that the engaged condition between the engaging pin 19' and the gear portion 17a is maintained to produce the click sound. On the other hand, when the drag mechanism is loosened, the knob 14 and the press element 17 move away from each other, so that the drag knob 14 becomes released from the spool shaft 3 and also the engaging pin 19' also becomes disengaged from the gear portion 17a thereby stopping the click sound. With this, the user can recognize that the drag knob 14 has been loosened.

Figure 9:
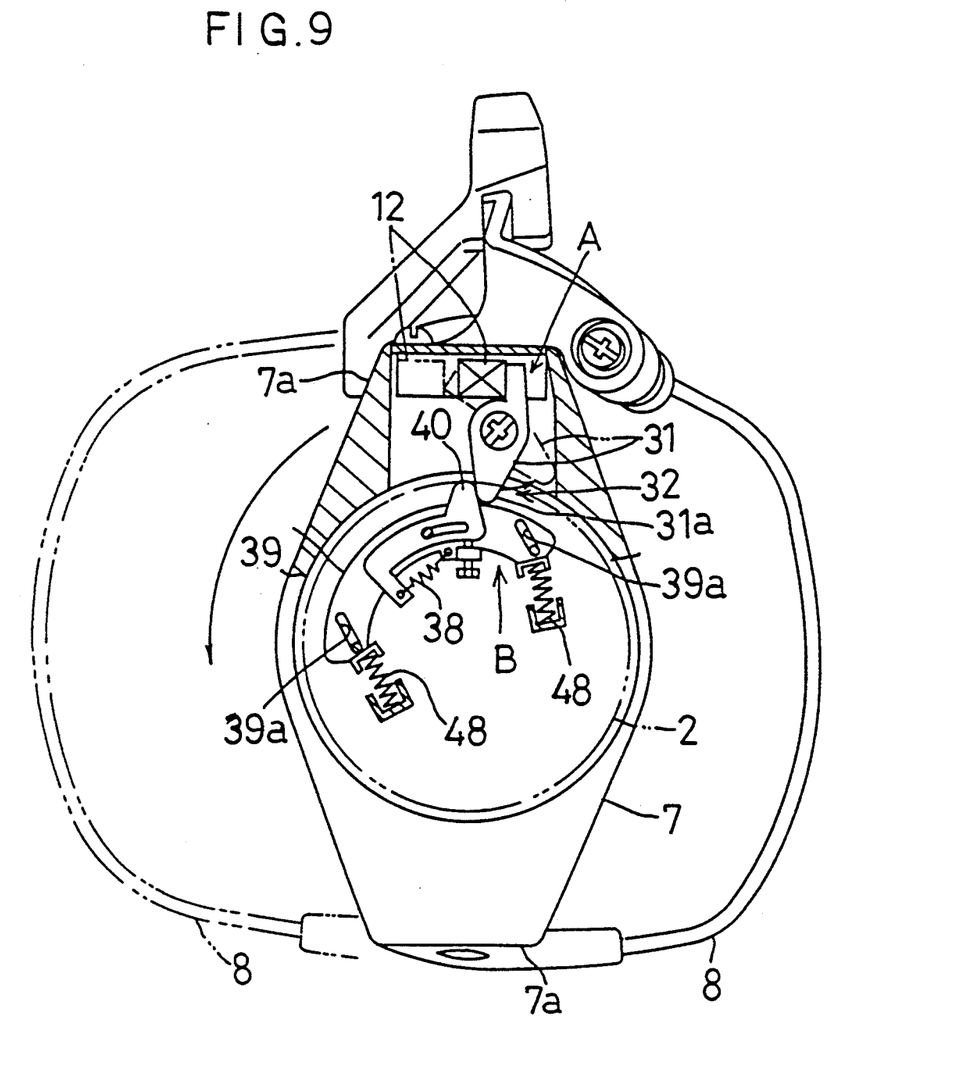
FIG. 9 is a rear view in vertical section showing a position switchover mechanism for switching over a bail arm to a line retrieving position.
Figure 10:
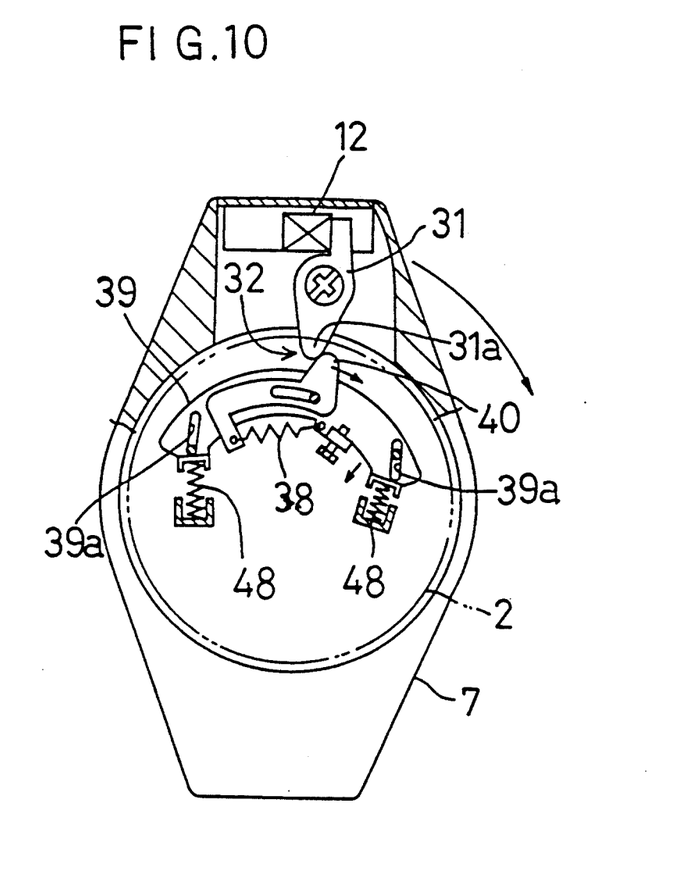
FIG. 10 is a rear view in section showing a condition where the position switchover mechanism is rotatably retracted in association with a reverse rotation of a rotary frame.
Figure 11:
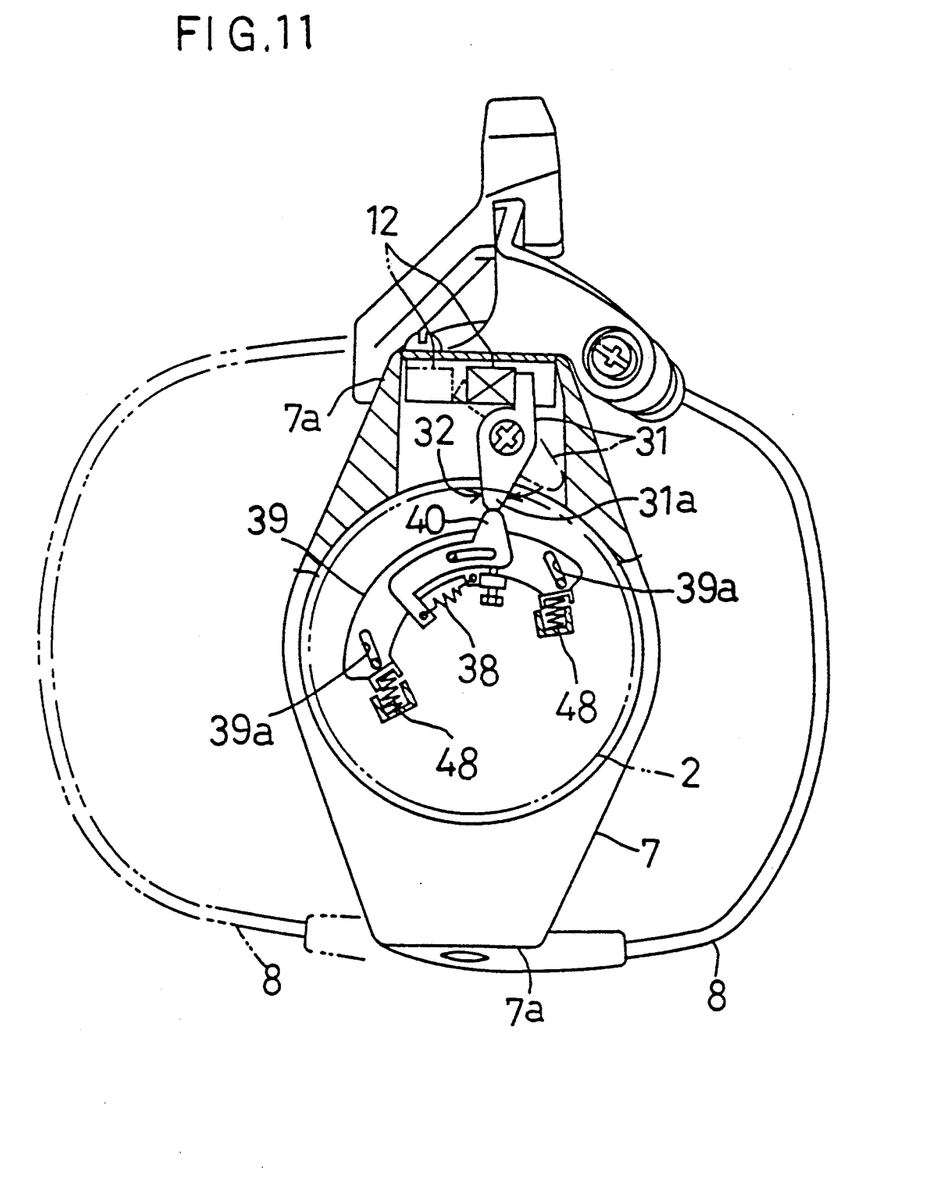
FIG. 11 is a rear view in vertical section showing position switchover mechanism about to switch over the bail arm to a line releasing position.

Next, the position switchover mechanism B for forcibly switching over the bail arm 8 from the line releasing position to the line retrieving position will be more particularly described. As shown in FIGS. 9 through 11, to an end portion of the spring holder 12 on the side of the reel body 2, there is attached the drive arm 31 for pivotably driving the spring holder 12. And, on an inner end portion of the drive arm 31, there is provided the contacted portion 31a which comes into contact with the projection portion 32 to be described later. As illustrated in FIG. 9, the projection portion 32 includes a cam element 40 which is retractable in the peripheral direction by a predetermined range through its contact with the drive arm 31 rotatable in unison with a rotation of the rotary frame 7 in the line retrieving direction and which is also returned to its home position by means of a first spring as a first urge mechanism 38 with release of the contact condition and a support element 29 which supports the cam element 40 and is retractable in the radial direction to allow passage of the drive arm 31 with application of a pressing force exceeding a predetermined value from the drive arm 31 and which is returned to its home position by means of a second spring as a second urge mechanism 48. Then, the urging force of the second spring 48 is so set as to exceed the pressing force applied to the cam element 40 from the drive arm 31 with the rotation of the rotary frame 7. That is, when the contacted portion 31a comes into contact with a side face of the projection portion 32 with the rotation of the rotary frame 7 in the line retrieving direction, the cam element 40 is temporarily retracted against the urging force of the first spring 38. However, since the pressing force applied to the cam element 40 is smaller in magnitude than the predetermined urging force of the second spring 48, the cam element 40 receives the contacted portion 31a to pivotably drive the drive arm 31. Thereafter, the drive arm 31 pivotably drives the spring holder 12 to switch over the bail arm 8 to its line retrieving position. In switching over the bail arm 8 from the line retrieving position to the line releasing position, even if the contacted portion 31a and the cam element 40 become almost interlocked with each other, by forcibly operating the bail arm 8 towards the releasing position, the support element 39 as well as the cam element 40 is retracted against the urging force of the second spring 48, so that the drive arm 31 will smoothly pass by the cam element 40. Thus, the drive arm 31 becomes freely rotatable and the bail arm 8 will be smoothly switched over to the line releasing position.

At right and left ends of the support element 39, there are formed radially inclined elongated slots 39a, 39a. As illustrated in FIG. 10, the direction of the inclination of these slots 39a, 39a is so adapted as to allow the contact of the drive arm 31 as one slot 39a is retracted relative to and about the other slot 39a.

Some further embodiments of the invention will be described next.

Figure 15:
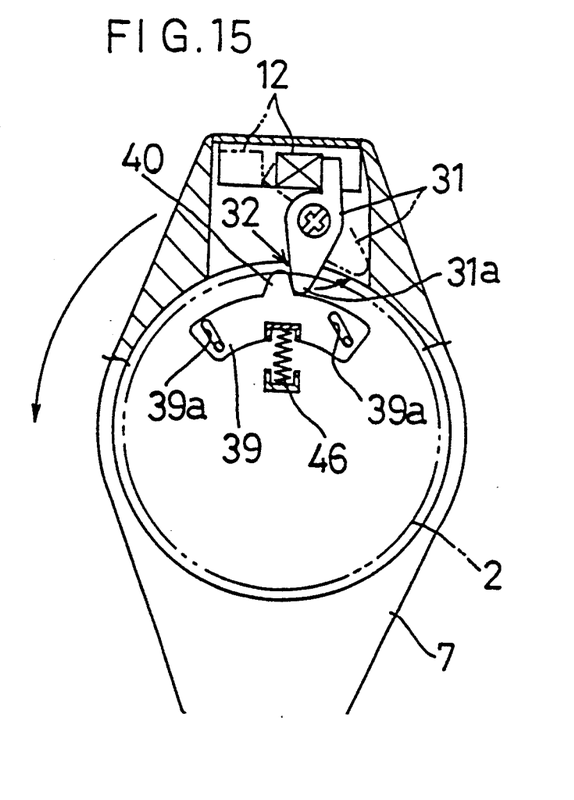
FIG. 15 is a rear view in vertical section illustrating a position switchover mechanism employed in a further embodiment of the present invention.

(1) As shown in FIG. 15, it is conceivable to form the cam element 40 and the support element 39 integrally with each other. In this case, the support element 39 will be provided with a convex portion 40 corresponding to the cam element 40. In operation, as the rotary frame 7 is rotated in the line retrieving direction, the support element 39 will not retract but drive the drive arm 31 to switch over the bail arm 8 to the line retrieving position. Also, if the drive arm 31 is forcibly pivoted towards the line releasing position, the support element 39 will retract along the extending directions of the elongated slots against the urging force of the spring 46 thereby to switch over the bail arm 8 to the line releasing position.

(2) As the urge mechanisms, various other types than the coil spring type can be employed such as a torsion spring, a plate spring and so on.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A spinning reel comprising:
   a reel body;
   a rotary frame supported on said reel body, said rotary frame having an axis of rotation and being rotatable about said axis in line retrieving and line releasing directions, said rotary frame having first and second support arms, with said axis of rotation being between said support arms;
   a bail arm attached to said first and second support arms, said bail arm being pivotable between line releasing and line retrieving positions;
   a toggle urge mechanism for applying an urging force to said bail arm to selectively maintain said bail arm at said line releasing and line retrieving positions; and
   switchover means for overcoming said urging force and for pivoting said bail arm from said line releasing position to said line retrieving position responsive to rotation of said rotary frame in said line retrieving direction, said switchover means including:
      a drive arm pivotably connected to said rotary frame, said drive arm having first and second ends; means on the rotary frame engageable with said first end of said drive arm for transmitting motion of said drive arm to said bail arm;
      a projection connected to said reel body, said projection being engageable with said second end of said drive arm, such that rotation of said rotary frame in said line retrieving position causes said drive arm to be pivoted by said projection, which causes said bail arm to be pivoted from said line releasing position to said line retrieving position; and
      a projection urging mechanism for permitting relative movement between said drive arm and said projection and for thereby permitting disengagement of said drive arm from said projection said relative movement between said drive arm and said projection being other than that which is caused by rotation of said frame with respect to said reel body.

2. A spinning reel as defined in claim 1, wherein said projection urging mechanism includes a guide for guiding said projection in a radial direction relative to said axis of rotation, and an urging means for urging said projection in said radial direction.

3. A spinning reel as defined in claim 1, further comprising means for displacing said projection in an arcuate direction around said axis of rotation.

4. A spinning reel as defined in claim 1, wherein said drive arm is pivotable about an axis that is parallel to said axis of rotation of said rotary frame, and wherein said second end of said drive arm is movable toward and away from said axis of rotation of said rotary frame, and wherein said rotary frame has an interior wall, and wherein said projection urging mechanism further comprises:
   a support member extending along said interior wall of said rotary frame;
   a plurality of first coil springs connecting said support member to said reel body, said projection being mounted on said support member, said projection being displaceable relative to said support member in an arcuate direction around said axis of rotation of said rotary frame; and a second coil spring for urging said projection in said arcuate direction.

5. A spinning reel as defined in claim 1, wherein said drive arm is pivotable about an axis that is parallel to said axis of rotation of said rotary frame, and wherein said second end of said drive arm is movable toward and away from axis of rotation of said rotary frame, and wherein said rotary frame has an interior wall, and wherein said projection urging mechanism further comprises:

a plurality of engaging protrusions;

a support member extending along said interior wall of said rotary frame, said support member having guide grooves for receiving said protrusions and for guiding displacement of said support member relative to said reel body;

a projecting member integrally connected to said reel body; and a coil spring connecting said support member to said reel body, said coil spring allowing for displacement of said support member in a radial direction toward said axis of rotation of said rotary frame and in an arcuate direction around said axis of rotation of said rotary frame.

6. A spinning reel comprising:

a reel body;

a rotary frame supported on said reel body, said rotary frame having an axis of rotation and being rotatable about said axis in line retrieving and line releasing directions, said rotary frame having first and second support arms, with said axis of rotation being between said support arms;

a bail arm attached to said first and second support arms, said bail arm being pivotable between line releasing and line retrieving positions;

a toggle urge mechanism for applying an urging force to said bail arm to selectively maintain said bail arm at said line releasing and line retrieving positions; and switchover means for overcoming said urging force and for pivoting said bail arm from said line releasing position to said line retrieving position responsive to rotation of said rotary frame in said line retrieving direction, said switchover means including:

a drive arm pivotably connected to said rotary frame, said drive arm having first and second ends means on the rotary frame engageable with said first end of said drive arm for transmitting motion of said drive arm to said bail arm; and a projection connected to said reel body, said projection being displaceable relative to said reel body between first and second positions, with said projection being engageable with said second end of said drive arm when said projection is in said first position, such that rotation of said rotary frame in said line retrieving direction causes said drive arm to be pivoted by said projection, which causes said bail arm to be pivoted from said line releasing position to said line retrieving position, and wherein said projection is arranged to be moved to said second position by said drive arm.

* * * * *